US008882165B2

(12) United States Patent
Lipson et al.

(10) Patent No.: US 8,882,165 B2
(45) Date of Patent: Nov. 11, 2014

(54) GRIPPING AND RELEASING APPARATUS AND METHOD

(75) Inventors: Hod Lipson, Ithaca, NY (US); John R. Amend, Jr., Ithaca, NY (US); Heinrich Jaeger, Chicago, IL (US); Eric Brown, Merced, CA (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 13/641,230

(22) PCT Filed: Apr. 14, 2011

(86) PCT No.: PCT/US2011/032429
§ 371 (c)(1),
(2), (4) Date: Dec. 21, 2012

(87) PCT Pub. No.: WO2011/130475
PCT Pub. Date: Oct. 20, 2011

(65) Prior Publication Data
US 2013/0106127 A1 May 2, 2013

Related U.S. Application Data

(60) Provisional application No. 61/324,567, filed on Apr. 15, 2010, provisional application No. 61/436,688, filed on Jan. 27, 2011.

(51) Int. Cl.
*B25J 15/00* (2006.01)
*B66C 1/44* (2006.01)
*B25J 15/12* (2006.01)

(52) U.S. Cl.
CPC .............. *B25J 15/0023* (2013.01); *B25J 15/12* (2013.01)
USPC ........................... 294/86.4; 294/188; 294/189

(58) Field of Classification Search
USPC .............. 294/86.4, 183, 64.3, 186, 188, 189, 294/902; 248/362
See application file for complete search history.

(56) References Cited

U.S. PATENT DOCUMENTS

| 3,318,629 | A | * | 5/1967 | Brandt, Jr. ................. 294/103.1 |
| 3,675,962 | A | * | 7/1972 | Simpson ...................... 294/902 |
| 4,294,424 | A | * | 10/1981 | Teissier ......................... 248/362 |
| 4,561,686 | A | * | 12/1985 | Atchley ........................ 294/86.4 |
| 5,518,231 | A |   | 5/1996 | Reddy |

(Continued)

FOREIGN PATENT DOCUMENTS

WO        2006082100 A1    8/2006

OTHER PUBLICATIONS

Liu, A. et al., Granular and jammed materials, The Royal Society of Chemistry, Soft Matter, 2010, 6, pp. 2869-2870.

(Continued)

*Primary Examiner* — Paul T Chin
(74) *Attorney, Agent, or Firm* — William Greener; Bond, Schoeneck & King, PLLC (57) ABSTRACT

A passive universal gripper includes a mass of granular material encased in an elastic membrane. Using a combination of positive and negative pressure, the gripper can rapidly grip and release a wide range of objects that are typically challenging for conventional universal grippers, such as flat objects, soft objects, or objects with complex geometries. The gripper passively conforms to the shape of a target object, then vacuum-hardens to grip it rigidly; later using positive pressure to reverse this transition—releasing the object and returning to a deformable state. The apparatus and method enable the fast ejection of objects from the gripper, as well as essentially instantaneous reset time between releasing and gripping.

22 Claims, 9 Drawing Sheets

(56) References Cited

U.S. PATENT DOCUMENTS

| | | | |
|---|---|---|---|
| 6,226,820 B1* | 5/2001 | Navarro | 5/655.5 |
| 6,846,029 B1 | 1/2005 | Ragner et al. | |
| 6,994,387 B1 | 2/2006 | Ragner et al. | |
| 8,548,626 B2 | 10/2013 | Steltz et al. | |
| 8,651,543 B2* | 2/2014 | Matsuoka et al. | 294/902 |
| 2006/0033350 A1 | 2/2006 | Besch | |
| 2008/0213593 A1 | 9/2008 | Bala Subramaniam et al. | |
| 2009/0242719 A1* | 10/2009 | Carnevali | 248/346.2 |
| 2010/0054903 A1* | 3/2010 | Jones et al. | 294/86.4 |
| 2010/0217436 A1 | 8/2010 | Jones et al. | |
| 2013/0033050 A1* | 2/2013 | Matsuoka et al. | 294/86.4 |

OTHER PUBLICATIONS

Van Hecke, M., Jamming of soft particles: geometry, mechanics, scaling and isostaticity, J. Phys.: Condens. Matter 22 (2010) 033101 (24pp) doi:10.1088/0953-8984/22/3/033101, pp. 1-24.

Ellenbroek, W., et al., Force Response as a Probe of the Jamming Transition, 2005, pp. 1-4.

Steltz, E., et al., JSEL: Jamming Skin Enabled Locomotion, 2010, pp. 1-6.

Steltz, E., et al., Jamming as an Enabling Technology for Soft Robotics, 2010, pp. 1-9.

Mozeika, A., et al., The First Steps of a Robot Based on Jamming Skin Enabled Locomotion, 2010, pp. 1-2.

Jaeger, H., Sand, jams and jets, Physics World, Dec. 2005, pp. 34-39.

Majmudar, T., et al., Jamming Transition in Granular Systems, Physical Review Letters, week ending Feb. 2, 2007, PRL 98, 058001 (2007), pp. 058001-1-058001-4.

Hiller, J., et al., Evolving Amorphous Robots, Proc. of the Alife XII Conference, Odense, Denmark, 2010, pp. 717-724.

Kim, K. et al., Jamming transition in a highly dense granular system under vertical vibration, Physical Review E 72, 011302, 2005, pp. 011302-1-011302-4.

* cited by examiner

GRIPPING AND RELEASING APPARATUS AND METHOD

RELATED APPLICATION DATA

The instant application claims priority to U.S. Provisional application Ser. No. 61/436,688 filed on Jan. 27, 2011 and 61/324,567 filed on Apr. 15, 2010, the subject matter of both being incorporated herein by reference in their entireties.

GOVERNMENT FUNDING

This invention was made with Government support under Project ID Number W911NF-08-1-0140 awarded by DARPA. The United States Government has certain rights in the invention.

BACKGROUND

1. Field of the Invention

Embodiments of the invention are in the field of robotics. More particularly, embodiments of the invention pertain to passive-type universal robot gripping and releasing apparatus and systems, associated methods, and applications thereof.

2. Related Art

Universal robot grippers are robotic end effectors that can grip a wide variety of arbitrarily-shaped objects. Proposed universal grippers have ranged from vacuum-based suction grippers to multi-fingered hands. These can be divided into two categories: active universal grippers and passive universal grippers.

Active universal grippers typically have an anthropomorphic, multi-fingered design, inspired by the human hand. Many such grippers have been developed, and multi-fingered grasping remains an active area of research. The active universal grippers that have been proposed are capable of both grasping and manipulation, but also engender extensive physical and computational complexity, which is evident in grasp algorithm research. The complexities of active universal grippers, coupled with their correspondingly high costs, have limited their adoption among commercial robotics industries.

Passive universal grippers, on the other hand, require minimal grasp planning. They are under actuated, and include components that passively conform to unique object geometries, giving them the ability to grip widely varying objects without readjustment (see, e.g., P. B. Scott, "The 'Omnigripper': a form of robot universal gripper," Robotica vol. 3, pp. 153-158, September 1985; R. Tella, J. Birk, and R. Kelley, "A contour-adapting vacuum gripper," Robot Grippers, D. T. Pham and W. B. Heginbotham, Eds. New York, N.Y.: Springer-Verlag, 1986, pp. 86-100; S. Hirose, "Connected differential mechanism and its applications," Robot Grippers, D. T. Pham and W. B. Heginbotham, Eds. New York, N.Y.: Springer-Verlag, 1986, pp. 141-153; A. M. Dollar and R. D. Howe, "A robust compliant grasper via shape deposition manufacturing," IEEE/ASME Trans. Mechatron. vol. 11, pp. 154-161, April 2006). For example Scott, id., reported a gripper design in which many independent telescoping pins could each passively slide in or out to conform to the shape of a target object, then pinch from the side to grip the object.

Passive universal grippers are generally simpler to use and require minimal visual preprocessing of their environment, but they too have had limited success gaining widespread adoption. Often their many passive components are easy to damage and difficult to replace. Passive universal grippers can be very expensive as well, and their ability to grip many different objects often renders them inferior at gripping any one object in particular.

One approach to achieving a lower threshold of universal gripping is to add deformable materials to the gripping faces of a traditional jawed gripper in order to increase the compliance of the surfaces. This technique is straightforward and can be sufficient for some applications. Simpson (D. C. Simpson, "Gripping surfaces for artificial hands" Hand, Vol 3, pp. 12-14, February 1971) was likely the first to suggest adding pockets of granular materials to gripping surfaces for this purpose, and later Schmidt (I. Schmidt, "Flexible moulding jaws for grippers," Ind. Robot, vol. 5, pp. 24-26, March 1978) and Perovskii (A. P. Perovskii, "Universal grippers for industrial robots," Rus. Eng. J., vol 60, pp. 9-11, August 1980) proposed designs that allowed vacuum hardening of similar grain-filled pockets to produce a custom gripper jaw shape. Reinmueller and Weissmantel (T. Reinmuller and H. Weissmantel, "A shape adaptive gripper finger for robots," Proc. Int. Symp. on Ind. Robots, April 1988, pp. 241-250), while presenting a similar idea, went so far as to speculate that a single membrane filled with granular material might be able to grip an object on its own and function as a passive universal gripper. However, this idea was not demonstrated in practice or rigorously explored until the universal jamming gripper recently presented by us in E. Brown, N. Rodenberg, J. Amend, A. Mozeika, E. Steltz, M. Zakin, H. Lipson, H. Jaeger, "Universal robotic gripper based on the jamming of granular material," Proc. Natl. Acad. Sci., vol. 107, pp. 18809-18814, November 2010.

Figure 1:
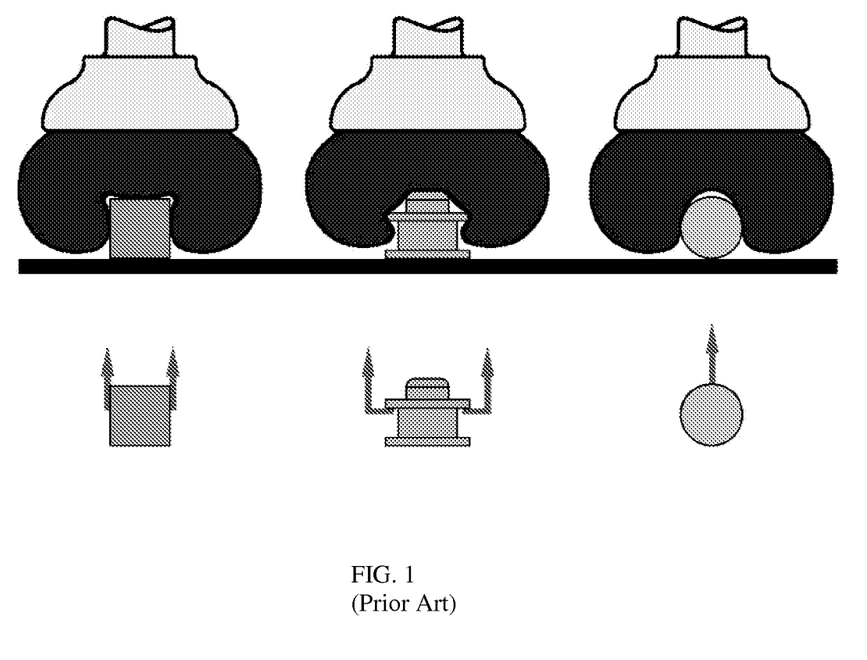
FIG. 1 is a schematic drawing illustrating how a jamming gripper can achieve three separate gripping modes: static friction from surface contact (left), geometric constraints from interlocking (center), and vacuum suction from an airtight seal (right), as known in the art.

Passive, universal jamming grippers exploit the temperature independent fluid-like to solid-like pseudo-phase transition of granular materials known as jamming (see, e.g., T. S. Majmudar, M. Sperl, S. Luding, R. P. Behringer, "Jamming transition in granular systems," Phys. Rev. Lett., vol. 98, 058001, February 2007; A. J. Liu and S. R. Nagel, "Jamming is not just cool any more," Nature vol. 396, pp. 2122, November 1998; M. E. Cates, J. P. Wittmer, J. P. Bouchaud, and P. Claudin, "Jamming, force chains, and fragile matter," Phys. Rev. Lett., vol. 81, pp. 18411844, August 1998; A. J. Liu and S. R. Nagel, Jamming and rheology: constrained dynamics on microscopic and macroscopic scales, Taylor & Francis, London, 2001; C. S. O'Hern, L. E. Silbert, A. J. Liu, and S. R. Nagel, "Jamming at zero temperature and zero applied stress: the epitome of disorder," Phys. Rev. E, vol. 68, 011306, July 2003; E. I. Corwin, H. M. Jaeger, and S. R. Nagel "Structural signature of jamming in granular media," Nature, vol. 435, pp. 10751078, April 2005). This type of gripper leverages three possible gripping modes for operation: (a) static friction from surface contact, (b) geometric constraints from capture of the object by interlocking, and (c) vacuum suction when an airtight seal is achieved on some portion of the object's surface. These three gripping modes are illustrated in FIG. 1. By achieving one or more of these modes, the jamming gripper can grip many different objects with widely varying shape, weight, and fragility, including objects that are traditionally challenging for other universal grippers. For example we have successfully been able to grip a coin, a tetrahedron, a hemisphere, a raw egg, a jack toy, and a foam earplug. The gripper functions entirely in open loop, without grasp planning, vision, or sensory feedback.

When the gripped object is to be released, the gripper is vented to return to atmospheric (neutral) pressure and the object is let go. The performance of universal jamming grippers are limited by the need to reset the gripper between gripping tasks. An imprecise kneading or massaging procedure is often necessary to return the gripper to a neutral state (i.e., manually resetting the gripper), or else its ability to grip subsequent objects rapidly degrades.

In view of the foregoing disadvantages, shortcomings, and problems known in the art, the inventors have recognized the benefits and advantages of, as well as the solutions provided by, an improved passive universal gripping apparatus, systems utilizing one or more passive universal gripping apparatus, associated methods, and applications and, particularly, such apparatus, systems, methods, and applications that enable and utilize better object release, object ejection, and faster reset time.

SUMMARY

An embodiment of the invention is a passive gripping and releasing apparatus that includes a deformable membrane having an opening fluidically coupled to a source of fluid ingress and egress in an evacuable sealing relationship; at least one port providing the source of fluid ingress and egress disposed in fluid connection with the opening of the membrane; and a granular material disposed within the membrane. According to various non-limiting aspects:
the granular material is characterized by having a volume change equal to or less than about 50% between a fluid phase and a solid phase of the material, more particularly, equal to or less than about 0.5%, and more particularly, equal to or less than about 0.05%;
the at least one port includes a fluid evacuation port and a fluid input port;
the apparatus further includes a base disposed in coupling relation with the membrane;
the apparatus further includes a filter disposed in coupling relation with the opening of the membrane;
the apparatus further includes a pump coupled to the at least one port;
the pump is a reversible action pump;
the pump is internal to the apparatus;
the apparatus further includes a reservoir of compressed fluid coupled to the at least one port;
the apparatus further includes a collar disposed on the base and extending at least partially around a region of the membrane adjacent the opening;
the membrane is made of a material that is flexible and evacuable;
the membrane may be made of any one of the following: vinyl, an elastomeric material, a coated cloth, a polyester film (e.g., Mylar), a metal foil, or particular combinations thereof;
the apparatus further includes a desiccant disposed within the apparatus;
the apparatus further includes means for reducing moisture within the apparatus;
the granular material disposed within the membrane may include small, individual solid granules or grains made from any type of metallic, insulating or semiconducting solid, including one or any combination of one or more of plastic or polymeric particles, coffee grounds, corn starch, ground glass, sand, rice, sawdust, crushed nut shells, oats, cornmeal, metal particles, dried ground corn husk, salt, seeds, ground rubber, rocks, and others known in the art;
the filling may include a granular material and a liquid;
the deformable membrane includes a plurality of independently controlled regions to which positive and negative fluid pressures can selectively be applied;
the independently controlled regions are self-contained and each include a granular material;
the apparatus further includes an internal membrane disposed internally of the membrane, wherein the granular material includes a finer-grained material and the internal membrane includes a coarser-grained material.

An embodiment of the invention is a gripping and releasing device that includes more than one passive gripping and releasing apparatus, each gripping and releasing apparatus further including a deformable membrane having an opening fluidically coupled to a source of fluid ingress and egress in an evacuable sealing relationship; at least one port providing the source of fluid ingress and egress disposed in fluid connection with the opening of the membrane; and a granular material disposed within the membrane. According to various non-limiting aspects:
at least some of the deformable membranes have different sizes;
each of the passive gripping and releasing apparatus is coupled to a controllable robotic arm.

An embodiment of the invention is a method for gripping and releasing an object. The method includes the steps of providing a passive universal jamming gripper including a suitable jamming material characterized by a fluid-like to solid-like phase transition upon application of a vacuum, wherein the gripper is in a gripped state in which an object is being gripped; and applying a positive fluid pressure to the jamming material to cause a solid-like to fluid-like phase transition, wherein the gripped object is actively released from the gripper. According to various non-limiting aspects:
the method further includes ejecting the gripped object by applying a sufficient positive fluid pressure;
the method further includes gripping an object substantially immediately upon release of
the gripped object by contacting the object and applying a negative fluid pressure to the jamming material;
the method further includes alternating the positive and negative fluid pressure between releasing the gripped object and gripping the object;
the method further includes vibrating the gripper between releasing the gripped object and gripping the object;
the step of applying a positive fluid pressure further includes using one of a gas and a liquid;
the gas is one of air, nitrogen, an inert gas.

According to various other non-limiting aspects of the apparatus and method:
the membrane will be flexible and will advantageously have a bending stiffness ranging from approximately $1 \times 10-5$ $Nm^2$ to $1 \times 10-4$ $Nm^2$;
the membrane should be impermeable to gas, such as air, so that a pressure differential can be maintained across the membrane;
the membrane should resist cuts, tearing, rupturing, wear, chemical instability, or other physical failures, however, even latex membranes (ASTM cut level 0—the lowest cut level rating) have been successfully used in prototypes. A durable membrane prolongs the life of the gripper, but is not necessary to achieve the gripping function;
membrane materials that provide a coefficient of static friction between the membrane and the target object of greater than approximately 0.2 are particularly advantageous, with higher coefficients offering improved performance;
membranes may, but need not be elastic. Elastic membranes with moduli in the range of approximately 10 MPa to 100 MPa are advantageous;
membranes may have either a smooth or a textured surface, or a combination thereof. Smooth membrane surfaces help to induce the vacuum suction gripping mode to the extent that they are able to maintain a pressure differential when pressed against a smooth target object surface;

membranes may be somewhat sticky, and the level of stickiness can be optimized for the application. Adhesion to steel ranging from 0 to approximately 10 oz/in width (ASTM D-3330) have been shown to be compatible with a positive pressure gripper; membrane thickness is determined by optimizing other characteristics such as flexiblilty, durability, toughness, friction coefficient, and size of the gripper. There are no limits to the thickness range, and typical membranes might have thicknesses from approximately 0.01 mm to 5 mm. Thinner membranes generally conform better to details of object geometry, while thicker membranes are generally more robust;

composite material membranes may provide desirable performance, e.g., by incorporating the tear resistance of a cloth membrane with the friction of an elastomeric coating. A composite material membrane is subject to the same considerations as outline above;

In regard to gripper size ranges:

the jamming principle is scale independent; therefore, the upper size of the gripper membrane is only limited by weight and durability considerations;

there is no fundamental lower size gripper limit; however, additional factors such as size of the granular particles and membrane thickness may eventually limit ultimate miniaturization;

there is no fundamental upper or lower size limit on grippers of any shape or arrayed in any combination;

In regard to granular material:

ideal grains flow well in the unjammed state and jam rigidly in the jammed state. A change in elastic modulus by a factor of 10 or larger is desirable when crossing the jamming transition;

strings can be combined with grains, e.g., to produce a composite that has high hardness and high bending stiffness;

In regard to fill density:

the quantity of grains used to fill the gripper membrane is governed by a tradeoff between trying to limit the free space inside the membrane and ensuring that the grains are loosely packed and can flow well in the unjammed state. Too much free space will cause the membrane to contract too much when the vacuum is applied, leading to a weak grip. Too little free space and the grains will not deform as well to the target object, also leading to a weak grip. In an aspect, ⅔ full, plus or minus a large range was successful, and limiting fill density will depend on membrane elasticity and flexibility;

In regard to vacuum/positive pressure:

the range of vacuum required to achieve gripping depends on the jamming material. For ground coffee in a latex balloon, for example, differential pressures larger than approximately 30 kPa (i.e., 70 kPa below atmospheric pressure in situations where the outside of the gripper is at ambient conditions) are required to begin to achieve significant gripping. The greater the pressure differential between the outside and the inside of the membrane, the larger the gripping strength will be as all three gripping mechanisms scale directly with pressure differential;

the speed of jamming depends on the rate at which the air or other gas is removed from the membrane. Varying the jamming speed has little influence on the grip performance;

objects held by the gripper are released when the vacuum within the gripper is released, allowing the granular material to unjam. Beyond releasing the object, further unjamming is usually required before the gripper is reset enough to execute a subsequent grip. Positive pressure accelerates the unjamming process by fluidizing the granular material, and can also impart additional force on the object to aid in ejection—even to the point of shooting the object some distance;

the required flow rate into the gripper provided by positive pressure is dependent on the desired performance and the size of the gripper. For shooting an object with an 8.5 cm diameter gripper, for example, positive flow rates between approximately 1 L/s and 10 L/s were required. Lower flow rates are required for smaller grippers and higher flow rates are required for larger grippers;

for resetting a gripper without ejecting an object, the volume of air flow into the gripper is more critical than the flow rate. The volume into the gripper should be approximately the same volume that was extracted from the gripper during vacuum-hardening. Replacing this volume at higher flow rates will cause increased fluidization of the grains, which is desirable;

neutralizing the pressure inside the gripper with the atmosphere (venting the gripper to atmosphere) is not necessary, but it simplifies the problem of pressure control by allowing the motion of the grains to dictate some air flow. If the gripper is vented to atmosphere when it is pressed against an object, it can passively accept or reject air as necessary to enable flow. A vent should advantageously resist this air flow as minimally as possible;

modulating the pressure within the gripper, e.g., oscillating between vacuum and positive pressure in the range of 1 Hz to 100 Hz, may be used to encourage grains to flow around a target object as the gripper is pressed against the object;

vibration may be used to encourage grains to flow around a target object as the gripper is pressed against the object. Possible methods for achieving these vibrations include: one or more motors with eccentric masses, one or more piezoelectric elements, or electromagnetic actuators embedded in the granular material. Concerning the magnitudes and frequency of vibration, accelerations ranging from below 1 g=9.8 m/s2 to several g can be used, with best frequency range from 10-100 Hz.

In regard to dehumidification or drying (important only for dry granular material) fully submerged grains, i.e., the membrane is at least partially filled with grains and then water, may be advantageous;

moisture can decrease the ability of some grain materials to flow in the unjammed state.

For these materials it is important to eliminate or minimize moisture within the system using desiccants, a dryer, a dehumidifier, or closing the system to specific gases such as nitrogen;

the drying means or method may be located within the membrane among the granular material (e.g., a desiccant), in the region of the filter, off-board of the gripper. Alternatively, desiccant grains can be mixed into the granular material itself.

The embodied gripper apparatus incorporates a system for applying positive pressure to the granular material. Using a combination of positive and negative pressure, the gripper can rapidly grip and release a wide range of objects that are typically challenging for conventional universal grippers, such as flat objects, soft objects, or objects with complex geometries. The gripper passively conforms to the shape of a target object, then vacuum-hardens to grip it rigidly, later using positive pressure to reverse this transition—releasing the object and returning to a deformable state. By using both positive and negative pressure, the gripper's performance, reliability, and speed all increase. The inventors have also demonstrated the fast ejection of objects from the gripper including launching a table tennis ball 50 cm vertically. In addition, multiple objects can be gripped and placed at once while maintaining their relative distance and orientation.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 3a is a photograph of the different size hemispheres used in a test of the embodied apparatus, ranging from 0.5 cm radius to 3.8 cm radius (left to right at top); and, FIG. 3b is a diagram of the experimental setup showing key dimensions. The apparatus picks the object at the pick location ($P_1$) and then moves to place the object at the place location ($P_2$). The contact angle between the gripper and the object is indicated by θ;

DETAILED DESCRIPTION OF EXEMPLARY EMBODIMENTS OF THE INVENTION

In the following description, reference is made to the accompanying drawings that form a part hereof, and in which are shown by way of illustration specific embodiments that may be practiced. These embodiments are described in sufficient detail to enable those skilled in the art to practice the invention, and it is to be understood that other embodiments may be utilized and that structural, logical, and electrical changes may be made without departing from the scope of the present invention. The following description of example embodiments is, therefore, not to be taken in a limited sense.

As used herein, the phrase "universal jamming gripper" means a passive universal gripper as described in E. Brown, N. Rodenberg, J. Amend, A. Mozeika, E. Steltz, M. Zakin, H. Lipson, H. Jaeger, "Universal robotic gripper based on the jamming of granular material," Proc. Natl. Acad. Sci., vol. 107, pp. 18809-18814, November 2010. In summary, a passive universal gripper utilizes an elastic-type membrane (e.g., a balloon) that contains an amount of granular material (e.g., coffee grounds, sand, other). At atmospheric pressure, the granular material is in a fluid-like phase such that it can flow, pour, or even splash. However, when a vacuum is applied, the granular material undergoes a pseudo-jamming-phase transition into a solid-like phase, i.e., there is essentially no relative movement of a single grain with respect to another. When the vacuum is released and the system returns to atmospheric pressure, the granular material will return to the fluid-like phase (either on its own over time or more quickly with external manipulation). This pseudo-phase transition arises out of the inherent solid-liquid duality of granular systems.

Figure 2:
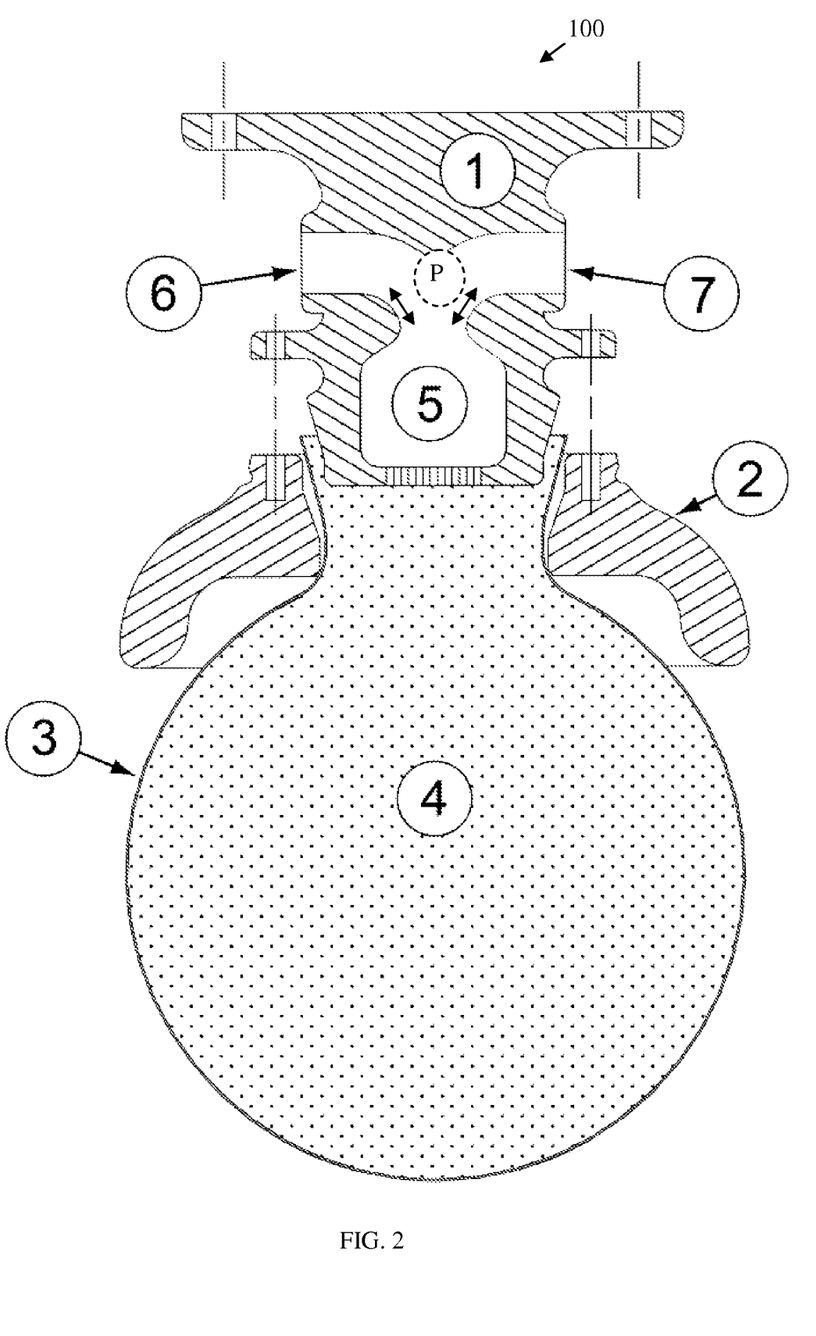
FIG. 2 is an assembly drawing of a passive gripping and releasing apparatus, according to an exemplary embodiment of the invention.

FIG. 2 illustrates a passive gripping and releasing apparatus 100. The apparatus utilizes both positive and negative pressure so that once the apparatus has passively contacted an object to be gripped and conformed to the shape of the object, a vacuum can be applied to vacuum-harden the filled membrane to rigidly grip the object and subsequently, one or more bursts of positive pressure are applied to reverse the fluid-like-to-solid-like phase transition (jamming), forcibly releasing the object and returning (resetting) the filled membrane to a deformable, ready state.

In its simplest form, a jamming gripper needs only to include some granular material contained in an evacuable membrane coupled to a negative pressure source in order to achieve its gripping behavior (e.g., the combination of ground coffee and a latex balloon has been found to work well (Brown et al., id.)), noting that no traditional actuators are required, just an off-board pump to evacuate the air from the gripper. According to an exemplary aspect, the embodied passive gripping and releasing apparatus 100 shown in FIG. 2 includes a base 1 (optional), an external collar 2 (optional), an elastic membrane 3 (e.g. latex balloon), granular filling material 4 (e.g., coffee grounds) within the membrane, an air filter 5 (optional), a vacuum line port 6, a positive pressure port 7, and an internal pump P (e.g., a reversible roller pump; optional)). As shown, the membrane 3 is pinched between the base 1 and the collar 2 producing an airtight (evacuable) seal. Other sealing apparatus and methods including but not limited to clamping, gluing, and others known in the art may also be effectively utilized. In this exemplary embodiment, the base and collar were manufactured from 3D printed plastic, which permits the intricate internal structures of the base. The optional collar is an advantageous element of the design as it helps guide the gripping/release apparatus as it conforms to an object, increasing the surface contact on vertical faces of the object and maximizing the potential for the interlocking gripping mode. The illustrated gripping/release apparatus can easily be interfaced to a commercial robot arm. The simple mechanical construction of the embodied gripping/release apparatus 100 contributes to low cost and easy manufacturability.

A prototype gripping/release apparatus as embodied by apparatus 100 of FIG. 2 included a latex balloon membrane that was pinched between the base and the collar producing an airtight seal. The balloon membrane thickness was 0.33 mm and it was filled with ground coffee beans to a volume of 350 cm$^3$. At this volume the balloon membrane was full but the membrane was not significantly stretched, so the membrane could easily be deformed in the unjammed state when contacted with an object. The filled membrane was nearly spherical, with a radius of approximately 4.3 cm. The relatively low density of ground coffee was advantageous because it can be used in larger quantities without weighing down the apparatus or straining the membrane in the way that a heavier material like sand would, for example.

It will be appreciated that various materials may effectively be used for the membrane element as long as they are substantially flexible and impermeable to air (i.e., will hold a vacuum). Additional advantageous attributes of a membrane material include resistance to tearing (which may be obtained by the use of multiple layers of membrane material), and some degree of stickiness or friction of the surface of the membrane. Non-limiting examples of membrane materials include elastomers, latex, vinyl, coated cloth, metal foil, Mylar, and others known in the art.

Various granular filling materials may also be utilized and materials will advantageously undergo about a 5% or less change in volume over the fluid-like to solid-like pseudo-phase transition (jamming). It is also advantageous that moisture in the system be substantially eliminated (i.e., when the fluid is not a liquid) as it slows the un-jamming transition due to additional capillary forces in the granular filling. A desiccant may be used in the membrane and/or in the filter. Alternatively, a dry fluid such as nitrogen or an inert gas, for example, could be used as the positive pressure fluid. An air drying system as known in the art could also be attached to the air lines of the apparatus.

To demonstrate performance, the embodied gripping/release apparatus was mounted on a commercial robot arm for testing. Positive pressure was provided by a pump at 620 kPa and a flow rate of 2.16 L/s. One or more fluid pressurized reservoirs could be used in place of or in combination with a positive pressure pump, which may enable a faster solid-like to fluid-like phase transition of the granular material. Vacuum was achieved with an off board vacuum pump. A maximum vacuum flow rate of 0.25 L/s was achieved with a pump rated for a maximum vacuum of 25 microns. For gripping, the jamming transition was considered complete when the pressure in the gripper dropped to −85 kPa, although usable vacuum pressures as high as −30 kPa were successfully used. The pressure in the gripping/release apparatus could also be neutralized with the atmosphere, and this state was used whenever the apparatus was pressed onto an object. Solenoid valves controlled by serial communication through the robot arm were used to modulate the pressure in the gripper. All tests were performed at 100% joint angle speed for the robot arm, which corresponds to approximately 23.7 cm/s linear speed of the gripping/release apparatus.

The gripping/release apparatus was first evaluated for its reliability in gripping objects of varying size. All objects were located at a position on a table that was hard-coded into the robot's software (the pick position). The robot was instructed to move to the pick position and press the gripping/release apparatus onto an object, then actuate the apparatus to induce the rigid state. Next, the robot was instructed to move to a place position, release the vacuum, and apply a short burst of positive pressure to eject the object. All tests were performed in open loop.

In the past, spheres have been used for test objects for jamming grippers, but spheres were not used for our test because the height of a sphere grows at twice the rate of its radius. In a size test, this would quickly lead to a situation where the gripping/release apparatus base and collar crash into larger spheres because the apparatus moves to the pick location in open loop. Instead, hemispheres were used (oriented flat side down) so that the surface geometry of a sphere test would be preserved but the height of the test objects would be reduced. Wooden hemispheres ranging from 0.5 cm radius to 3.8 cm radius were chosen, with a surface texture that was not smooth enough to permit an airtight seal between the gripper membrane and the hemisphere, therefore not inducing the vacuum mode of gripping. Since the objects are hemispheres, it is also impossible to achieve the interlocking gripping mode in this test. Each hemisphere was located in line with the central axis of the gripper, so that the contact angle θ would be as consistent as possible around the hemisphere. The test setup and the hemispheres used for this test can be seen in FIG. 3. The dimensions associated with FIG. 3 were as follows: $h_1$=4.8 cm, $h_2$=11.5 cm, $h_3$=13 cm, d=20 cm.

Figure 3:
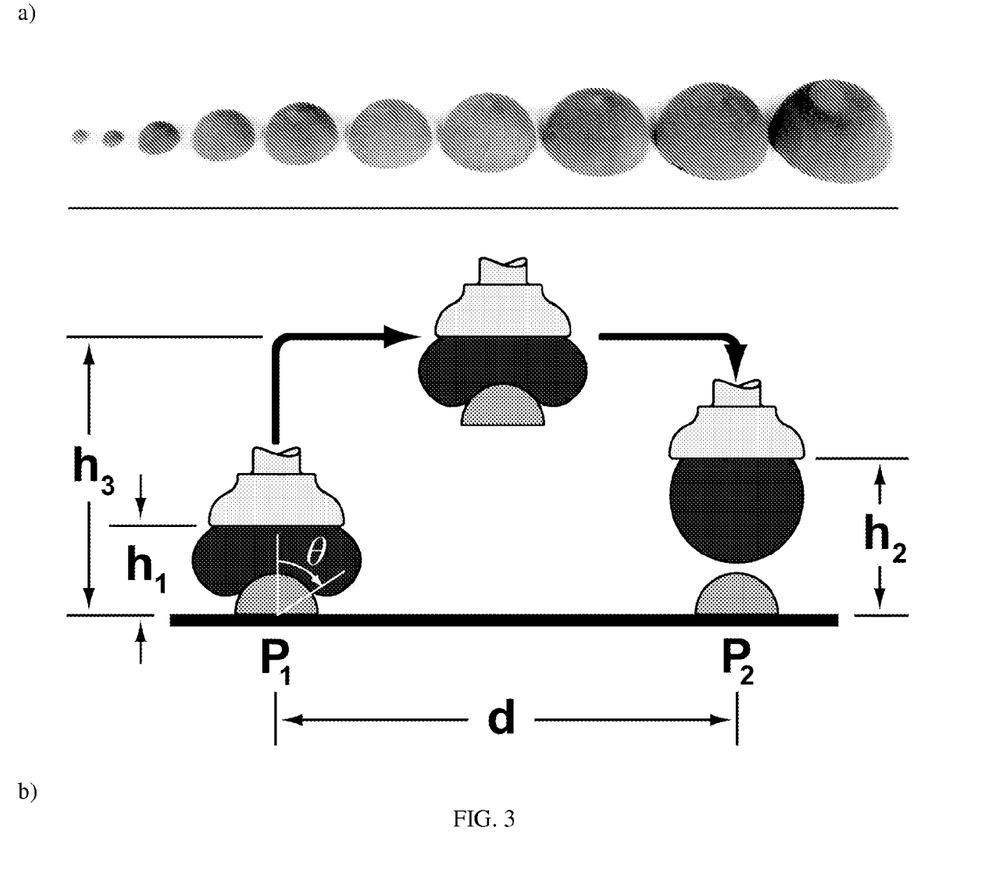
Figure 4:
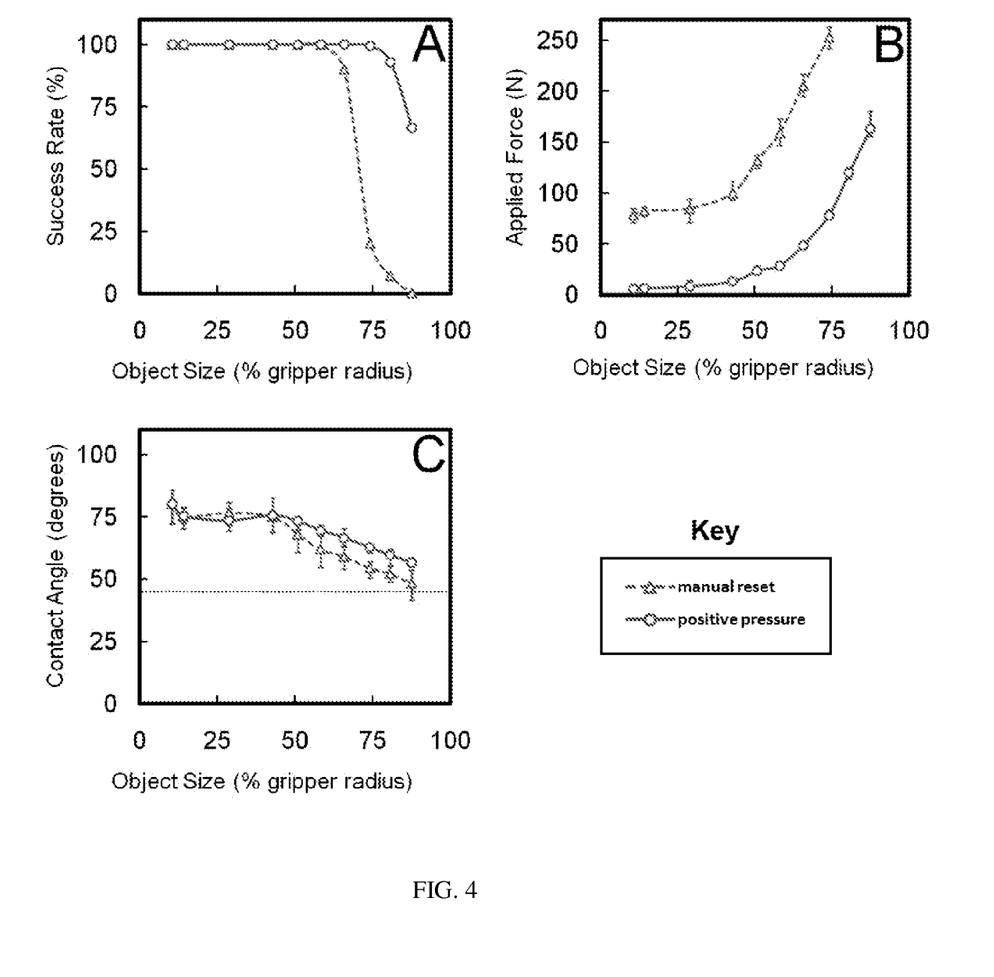
FIG. 4 shows the results of gripping tests on hemispheres of different radius using a manually reset gripping/release apparatus and an apparatus reset with positive pressure; (A) The success rate for gripping objects of varying size; (B) the force that the gripper applies to an object while deforming around it; and (C) the contact angle the gripping/release apparatus achieves. The horizontal dotted line in (C) indicates the critical 45° contact angle.

Test results are shown in FIG. 4. The ordinate of each plot is presented as a percentage of the membrane size in order to account for the scalability of the gripping/release apparatus. FIG. 4 shows the performance of the embodied positive pressure gripping/release apparatus compared to a passive universal gripper that must be manually reset by the user. Plots of success rate, applied force, and contact angle are shown. Success rate was determined over 30 trials for each hemisphere and represents how reliably the apparatus could grip hemispheres of varying size. Applied force is the force that a gripper applies to an object as it is deformed around it. This force is measured with a scale located beneath the test object. Contact angle is the maximum angle at which the gripper membrane and the object touch (indicated by θ in FIG. 3). For the applied force and contact angle tests, ten trials were performed on each hemisphere. For all three plots the data points represent the average of the trials, and the error bars indicate the maximum and minimum measurements recorded during the test. Hemispheres were tested in random order for all tests.

It can be seen that for a passive universal gripper not utilizing positive pressure, the gripper's success rate falls off sharply as the object radius reaches about 65% of the membrane radius, and falls to 0% for contact angles near 45° (the critical angle for gripping to occur). No minimum object radius was observed in this test, though no hemispheres under 5 mm radius were tested due to their lack of availability in wood. We also see that the applied force increases with increasing object size, as more grains inside the membrane need to be displaced around larger objects. Adding positive pressure dramatically increases the success rate of the gripping/release apparatus by as much as 85% for some hemispheres by increasing contact angle. Positive pressure also decreases the force applied to the object by as much as 90%. These performance increases are most likely due to increased fluidization of the granular material, which allows it to flow more easily around the target object.

Figure 5:
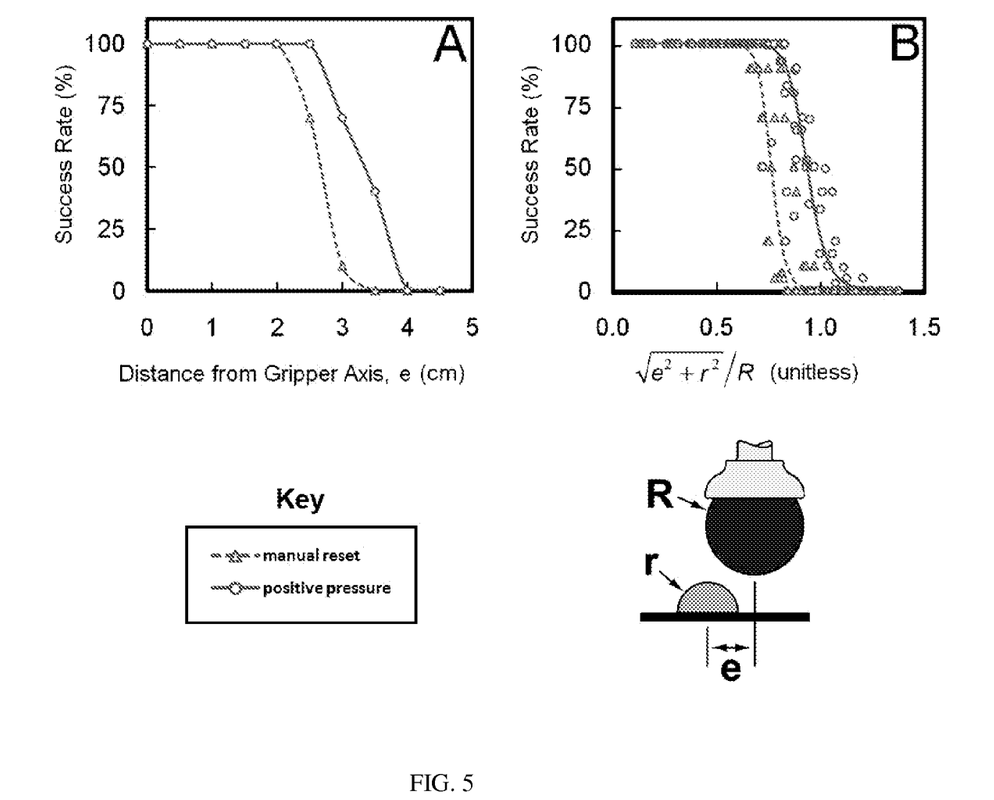
FIG. 5 shows results from testing the embodied apparatus against errors in the location of the target object. In (A), an error tolerance of about 3 cm as well as an increase in error tolerance of about 0.5 cm for the positive pressure apparatus can be seen for a hemisphere of 2.47 cm radius. In (B), error tolerance and reliability can be seen more generally for errors ranging from 0 to 4.5 cm and hemispheres ranging from 0.45 to 3.72 cm radius using the unitless value $[(e^2+r^2)^{1/2}]/R$.

In a second test, the embodied gripping/release apparatus was evaluated for tolerance to errors in the location of the target object. The same test setup from FIG. 3 was used, with hemispheres again employed as test objects. In this test, however, the target object was located between 0 and 4.5 cm away from the pick location $P_1$, thus causing the hemisphere to be unaligned with the central axis of the gripping/release apparatus. Results from this test are shown in FIG. 5. In FIG. 5A, only results for the 2.47 cm radius hemisphere are shown, and thirty trials were performed for each data point. FIG. 5B illustrates a more general relationship between target object size, location error, and gripping success rate, and ten trials were performed for each data point shown, with errors ranging from 0 to 4.5 cm and hemispheres ranging from 0.45 to 3.72 cm radius.

FIG. 5A could be redrawn for any of the hemispheres we tested and a similar improvement for the positive pressure gripping/release apparatus would be shown. However, we find that the expression $[(e^2+r^2)^{1/2}]/R$ allows us to observe the error tolerance and reliability of the apparatus more generally. This expression can be understood as the Euclidean distance from the apex of the target object to the point where the membrane touches the table along its central axis, compared with the radius of the membrane. It is a simple approximation for the total surface area the membrane will contact (table plus target object) as it attempts to wrap around the object to the critical contact angle, compared with the available surface area of the membrane. An analytical calculation of these two surface areas would likely produce a more accurate quantity, but such a calculation is prohibitively difficult due to the deformation and stretching of the membrane that occurs during the gripping process. We see in FIG. 5B that our approximation is sufficiently simple and accurate to collapse the data and allow for quick estimations of gripping success rate. In addition, the close similarity between FIG. 4A and FIG. 5B should be noted. This result is expected because $[(e^2+r^2)^{1/2}]/R$ reduces to r/R for e=0.

The error tolerance we observe for the embodied apparatus is very large considering its open loop function. In FIG. 5A, for example, we see that with the use of positive pressure our 3.5 cm radius membrane can successfully pick up a 2.47 cm radius hemisphere 100% of the time, even when the hemisphere is 2.5 cm away from its target location. It is likely that this large error tolerance would prove very useful for gripping tasks in unstructured environments where precise control over neither the situation nor the robot is possible.

Figure 6:
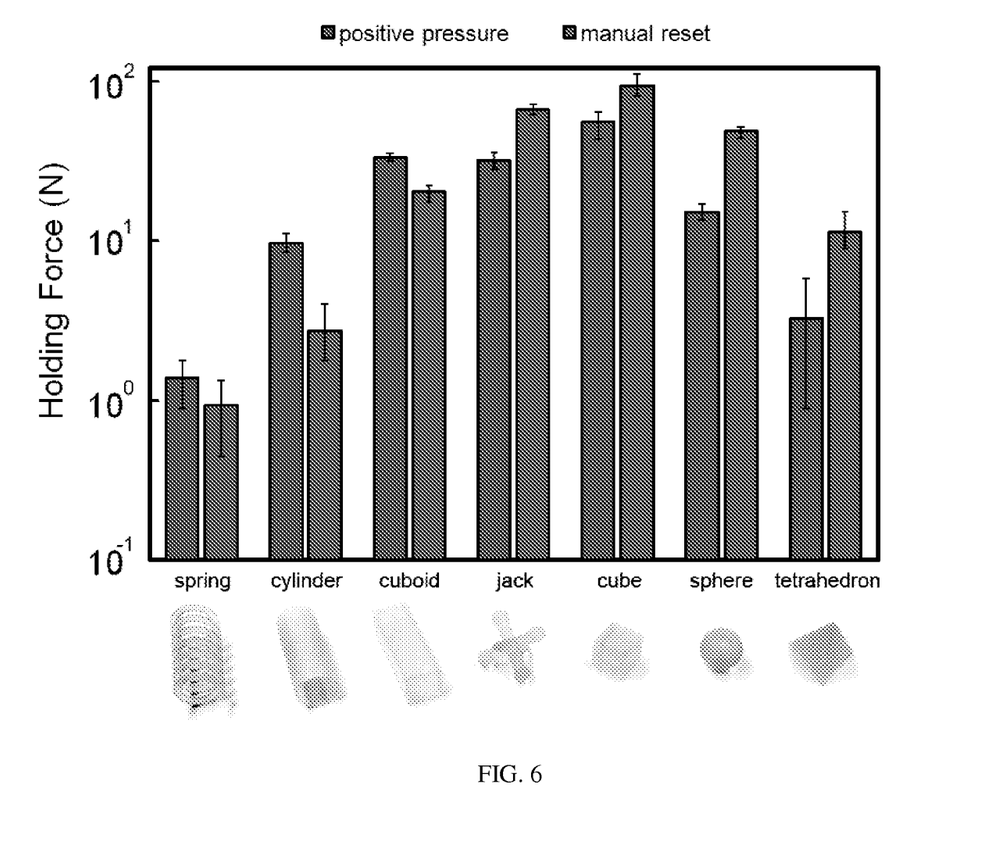
FIG. 6 is a bar graph showing comparative results for holding force between positive pressure release and manual reset for 3D printed plastic shapes: helical spring, cylinder, cuboid, jack toy, cube, sphere, and regular tetrahedron. The sphere is 2.6 cm in diameter.

In a third test, the positive pressure gripping/release apparatus was evaluated for the range of shapes that it could grip, and the forces with which it could retain those shapes. Seven shapes with similar mass, volume, and size were 3D printed for the test. The mass of each shape was 15.5 g±0.8 g. The minimum cross section of each shape was approximately 2.6 cm, a size chosen to be well within the 100% success rate from the previous test. The 3D printed material is not smooth enough for an airtight seal to be achieved. The shapes printed were: helical spring, cylinder, cuboid, jack toy, cube, sphere, and regular tetrahedron. A photograph of the shapes is shown on the ordinate of FIG. 6. To test the strength with which each object was retained, we measured the force required to pull each object out of the solidified (evacuated) membrane. The results of this test are shown in FIG. 6. Ten tests were performed for each shape, and the error bars indicate the maximum and minimum measurements recorded during the tests.

It can be seen that resetting the apparatus with positive pressure improves the holding force for objects that displace a larger volume of grains in the membrane, but decreases the holding force for smaller objects. This may be understood as a tradeoff between contact angle and applied force in the experimental setup. The enhanced flowability of the positive pressure apparatus allows for a larger contact angle as seen in FIG. 4C, and thus an enhanced holding force for the larger objects that displace a larger volume of grains. However, a problem occurs for the smaller objects which do not displace a large volume of grains. For these smaller objects, no significant increase in contact angle occurs, and instead the enhanced flowability may allow more grains to fall to the side of the object, possibly leaving a gap between the grains and the apparatus base. This is supported by the low values of applied force in FIG. 4B for the positive pressure apparatus, which are comparable to the weight of the grains for small objects. In this situation, when the membrane is evacuated, the grains may partially contract toward the open space near the base rather than toward the target object, resulting in less holding force. This is not an inherent problem with the positive pressure modification, as it could be fixed by applying more force to the target object, either by sensing the pick height to the target object size, or by using a robot arm with force feedback.

For the test setup in FIG. 3, a maximum gripping rate can be calculated. The limiting factors are the maximum speed of the robot arm, the time required to complete the jamming transition, the time required to reset the gripper between grips, and the time required to release the gripped object. The maximum speed of the robot arm was measured at 23.7 cm/s, which limits the maximum grip rate to 24 picks/min for the time required simply to move from $P_1$ to $P_2$ and back again. We consider the jamming transition complete when the pressure inside the membrane has dropped to −85 kPa, which takes 1.1 s for our 350 cm$^3$ membrane—this further limits the maximum gripping rate down to 16.7 picks/min.

A positive pressure jamming gripping/release apparatus requires only 0.1 s to release the object and reset the gripper with a single burst of positive pressure, which limits the maximum gripping rate finally to 16.2 picks/min. For a manually reset gripper, releasing the object and resetting the gripper is a bit more complicated. The time required to release an object depends on the geometry of the object, and slower release times limit the gripping rate. We measured the slowest release times at 0.6 s. Manually resetting the gripper requires the operator to perform an imprecise kneading or massaging routine, which took at least 2.0 s during our testing. Thus for a manually reset passive universal gripper, the maximum gripping rate is limited to 10.2 picks/min. The benefit of including positive pressure then is a 39% increase in gripping rate, in addition to the benefits of increased automation of the system and the elimination of possible human error when resetting the gripper.

Typically, placement accuracy is recognized as a sacrifice that must be made when developing a passive universal gripper in order to maximize the range of objects that may be gripped. However, placement accuracy is also a key performance measure for grippers used in manufacturing settings. Here, the embodied jamming gripping/release apparatus is evaluated for the accuracy with which it can place objects, again using the same test setup from FIG. 3 with slight modifications.

We first performed a calibration procedure to determine the accuracy of the robot arm itself. A pen was firmly mounted to the wrist of the robot, extending to approximately the same point at which the membrane's bottom edge makes contact with the table. A similar test procedure to FIG. 3 was then executed, with the pen marking a fixed piece of paper at the pick and place positions $P_1$ and $P_2$. With this setup, we were able to determine the precision of the arm to be +0.35 mm in the worst case for 95% confidence, with an average offset of 0.76 mm from the goal. This result is an order of magnitude larger than the manufacturer's reported repeatability of ±0.05 mm, which is likely due to the dynamic effects caused by moving the robot arm at full speed.

Next, the pen was removed from the robot arm and the apparatus was reattached. The robot arm was programmed to execute a pick and place routine with the hemisphere, again using the test setup from FIG. 3. Following placement of the hemisphere, we were able to measure its deviation from its intended position in the plane of the table. In this test, only the 1.82 cm radius hemisphere was used. This hemisphere is similar to the part sizes used in the shape test and is well within the 100% success rate range in the reliability test. The dimensions of FIG. 3 were modified slightly for this test to maximize placement accuracy: when testing the positive pressure gripper, $h_2$ was set at 8.8 cm, and when testing the manually reset gripper, $h_2$ was set at 7.1 cm. The results are shown in FIG. 7.

Figure 7:
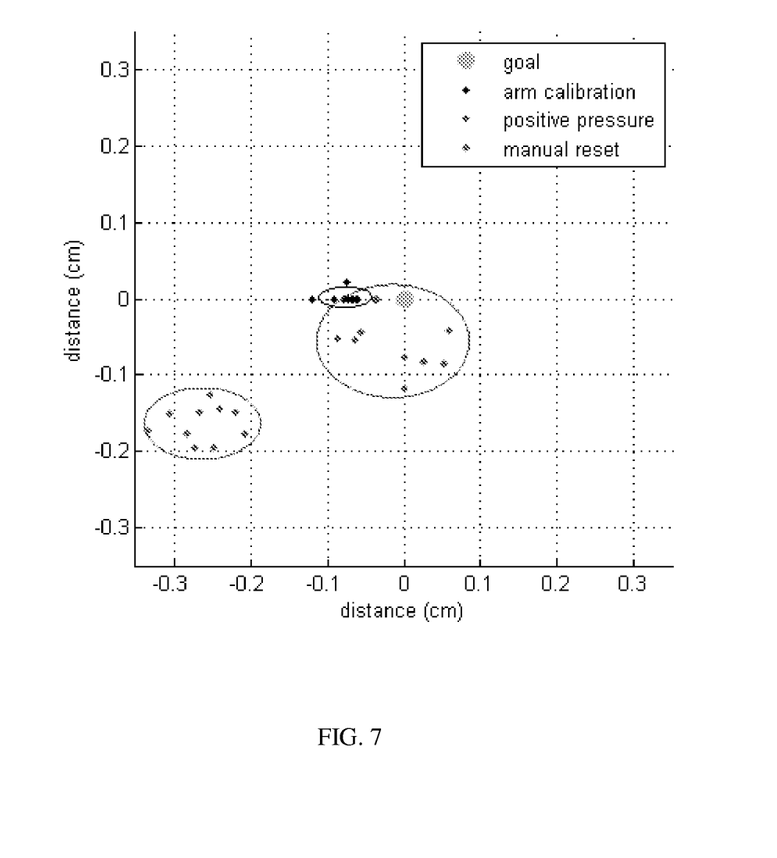
FIG. 7 shows placement test results for the calibration of the robot arm, test of the positive pressure gripper, and test of the manually reset gripper. Ellipses represent 95% confidence regions.

We see from FIG. 7 that the positive pressure apparatus places the hemisphere more accurately than the manually reset gripper, while the manually reset gripper is slightly more precise. Specifically, the average deviation of the positive pressure apparatus is 0.98 mm from the arm's calibration center, with a precision of +1.00 mm in the worst case for 95% confidence, while the average deviation for the manually reset gripper is 2.63 mm from the arm's calibration center, with a precision of +0.76 mm in the worst case for 95% confidence.

The angular placement accuracy of the two grippers was comparable. Here however, the manually reset gripper was slightly more accurate, while the positive pressure apparatus was slightly more precise. The manually reset gripper rotated the hemisphere by 5.4° on average, +3.4° for 95% confidence. The positive pressure apparatus rotated the hemisphere by 7.5° on average, ±1.8° for 95% confidence.

Figure 8:
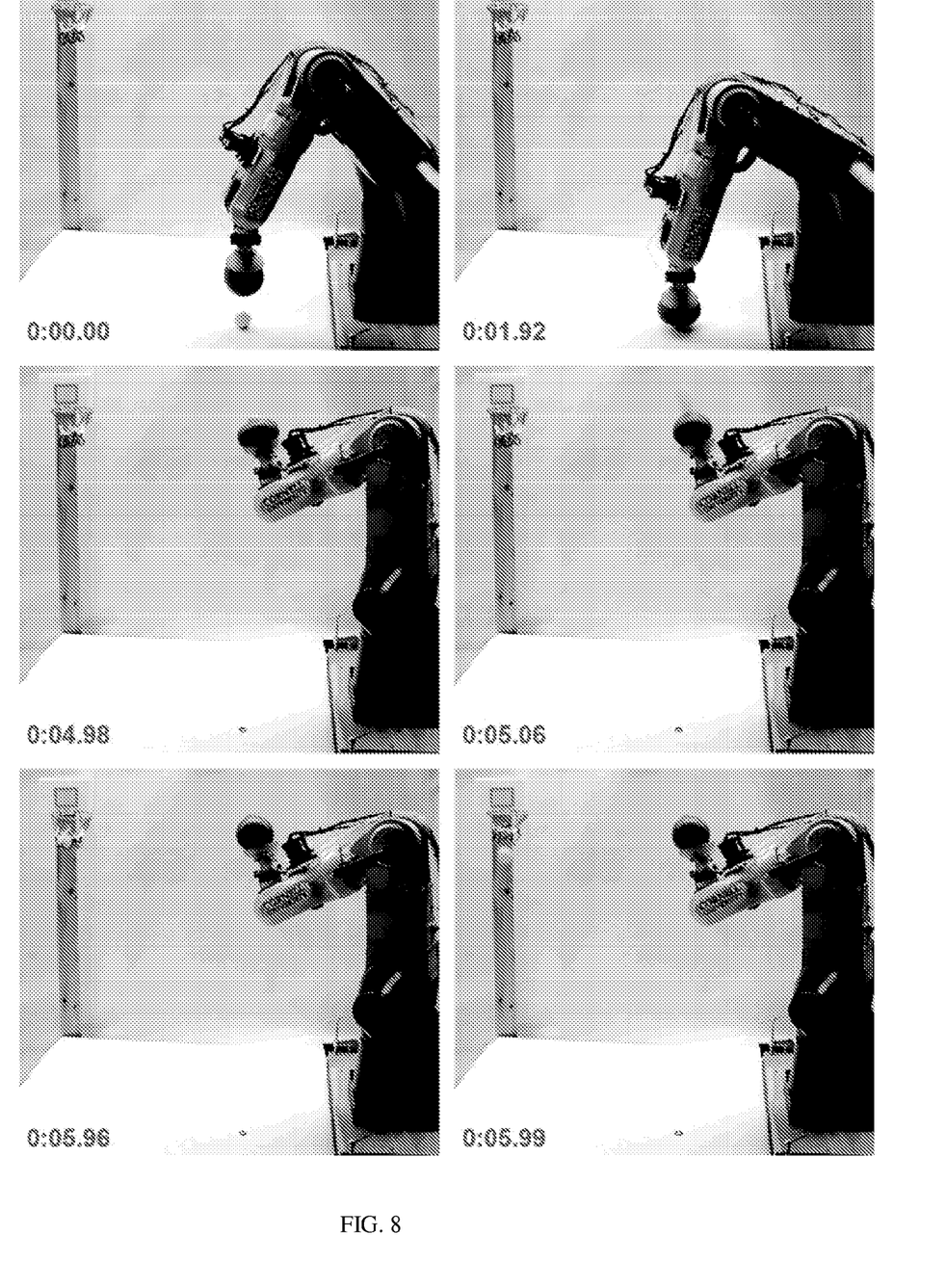
FIG. 8 shows a demonstration of throwing capability provided by a positive pressure apparatus, according to an illustrative aspect of the invention. The positive pressure jamming apparatus is shown throwing a table tennis ball into a hoop in six time-stamped frames from a video.

The placement accuracy improvement that we observe for the positive pressure jamming apparatus enables the repeatable shooting behavior shown in FIG. 8, which shows the embodied positive pressure apparatus throwing a table tennis ball into a hoop in six time-stamped frames from a video. Our preliminary testing finds that the shooting behavior is repeatable.

Figure 9:
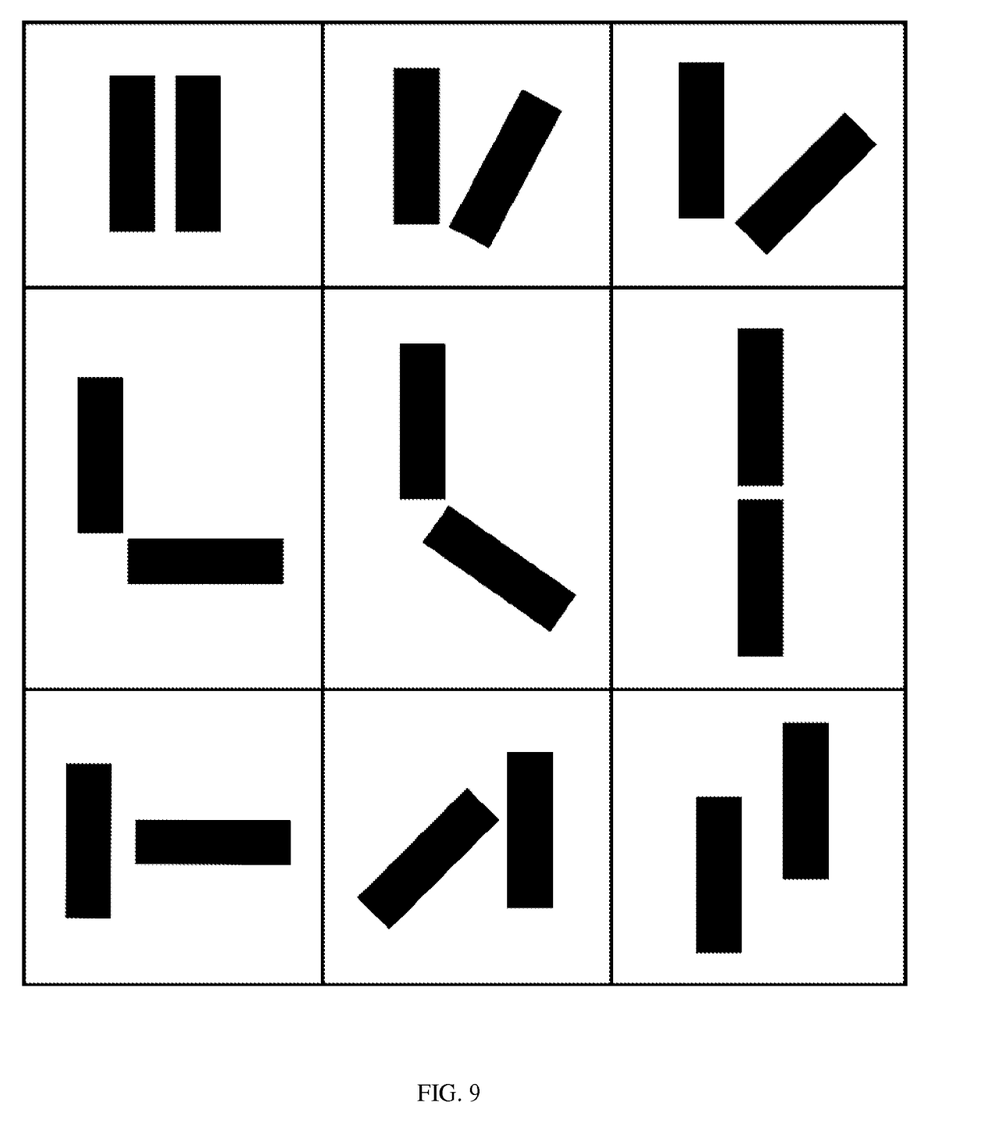
FIG. 9 shows nine starting configurations used to test the positive pressure jamming gripping/release apparatus's ability to grip multiple objects at once, shown from a top view, according to an illustrative aspect of the invention.

A unique feature of passive universal jamming grippers is their ability to grip multiple closely spaced objects simultaneously while maintaining their relative position and orientation. To quantify this capability we used two cuboids as test parts, each 1.3×1.3×4.5 cm. The gripping/release apparatus was evaluated for picking these objects at the nine starting configurations shown in FIG. 9. For each test the centroid of the combined shape was located on the central axis of the membrane. The relative distance and angle between the two objects was recorded before and after the gripping operation.

We found that for relative distance, the manually reset gripper tended to increase the separation between the objects by 0.08 cm on average ±0.86 cm for 95% confidence, while the embodied positive pressure apparatus tended to increase the separation between the objects by 0.77 cm on average ±1.07 cm for 95% confidence. In terms of relative angle, the manually reset gripper changed the angle between the objects by 6.7° on average, ±20.5° for 95% confidence, while the embodied positive pressure apparatus changed the angle between the objects by 5.2° on average, ±22.2° for 95% confidence.

This test shows a significant decrease in accuracy from the previous test where only one object was used. The increase in error is likely the result of grips that occur away from the central axis of the membrane, where off-axis forces that tend to rotate or translate the gripped objects are more likely to occur. The performance of the embodied positive pressure apparatus is slightly inferior to the manually reset gripper in this test, presumably because the rapid expansion of the membrane during the ejection of the object magnifies these off axis forces, producing increased rotations and translations of the gripped objects. This test reveals the importance of centering objects on the gripper's central axis in order to maximize placement accuracy.

The performance of both the embodied positive pressure apparatus and the manually reset gripper in this test indicates that they can be used to grip multiple objects at once, but that their ability to maintain the relative distance and angle between the objects is only suitable for tasks where a lower degree of accuracy is required. For example, this capability may be useful for transferring multiple aligned parts prior to a more accurate assembly operation.

We have disclosed a passive, universal, jamming, gripping and releasing apparatus that incorporates both positive and negative pressure. The design and manufacture of an exemplary prototype were described, and this prototype was evaluated against five metrics that revealed its capabilities for real-world applications. The apparatus proved capable at gripping objects of different size and shape, and showed an increase in reliability of up to 85%, an increase in tolerance for errors in the target object location, and an increase in speed of 39% over a manual reset a passive, universal, jamming gripper. The positive pressure apparatus also applied up to 90% less force on target objects, and demonstrated an increase in placement accuracy, which enabled a new throwing capability for the gripper. This ability to throw objects may be useful for tasks like, but not limited to, sorting objects into bins in a factory or throwing away trash in a home.

The embodied apparatus enables objects of very different shape, weight, and fragility to be gripped, and multiple objects can be gripped at once while maintaining their relative distance and orientation. This diversity of abilities may make the apparatus well suited for use in unstructured domains ranging from military environments to the home. The apparatus's airtight construction also provides the potential for use in wet or volatile environments and permits easy cleaning. Its thermal limits are determined only by the membrane material due to the temperature independence of the jamming phase transition, so use in high- or low-temperature environments may be possible. Further, the soft malleable state that the membrane assumes between gripping/releasing tasks could provide an improvement in safety when deployed in close proximity with humans, as in the home, for example.

All references, including publications, patent applications and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

We claim:

1. A passive gripping and releasing apparatus, comprising:
   a deformable membrane having an opening fluidically coupled to a positive source of fluid ingress and a negative source of fluid egress in an evacuable sealing relationship, wherein the positive source of fluid ingress is above atmospheric pressure;
   at least one port providing the source of fluid ingress and egress disposed in fluid connection with the opening of the membrane; and
   a granular material disposed within the membrane.

2. The apparatus of claim 1, wherein the granular material is characterized by having a volume change equal to or less than about 5% between a fluid phase and a solid phase of the material.

3. The apparatus of claim 1, wherein the at least one port includes a fluid evacuation port and a fluid input port.

4. The apparatus of claim 1, further comprising a base disposed in coupling relation with the membrane.

5. The apparatus of claim 4, further comprising a collar disposed on the base and extending at least partially around a region of the membrane adjacent the opening.

6. The apparatus of claim 1, further comprising a filter disposed in coupling relation with the opening of the membrane.

7. The apparatus of claim 1, further comprising a pump coupled to the at least one port.

8. The apparatus of claim 7, wherein the pump is a reversible action pump.

9. The apparatus of claim 7, wherein the pump is internal to the apparatus.

10. The apparatus of claim 1, wherein the membrane is made of one of vinyl, an elastomeric material, a coated cloth, a polyester film (Mylar), and a metal foil.

11. The apparatus of claim 1, further comprising a desiccant disposed within the apparatus.

12. The apparatus of claim 1, further comprising means for reducing moisture within the apparatus.

13. The apparatus of claim 1, wherein the granular material disposed within the membrane includes one of small, individual solid granules or grains made from any type of metallic, insulating or semiconducting solid, including one or any combination of one or more of plastic or polymeric particles, coffee grounds, corn starch, ground glass, sand, rice, sawdust, crushed nut shells, oats, cornmeal, metal particles, dried ground corn husk, salt, seeds, ground rubber, rocks.

14. The apparatus of claim 1, further wherein the deformable membrane includes a plurality of independently controlled regions to which positive and negative fluid pressures can selectively be applied.

15. The apparatus of claim 14, further wherein the independently controlled regions are self-contained and each include a granular material.

16. The apparatus of claim 1, wherein the positive source of fluid ingress is configured to supply one or more bursts of positive pressure.

17. The apparatus of claim 1, wherein the at least one port providing the source of fluid ingress and egress comprises two ports disposed in an in-line relationship.

18. A gripping and releasing device, comprising:
    a plurality of passive gripping and releasing apparatus, each gripping and releasing apparatus further comprising:
       a deformable membrane having an opening fluidically coupled to a positive source of fluid ingress and a negative source of fluid egress in an evacuable sealing relationship, wherein the positive source of fluid ingress is above atmospheric pressure;
       at least one port providing the source of fluid ingress and egress disposed in fluid connection with the opening of the membrane; and
       a granular material disposed within the membrane.

19. The device of claim 18, wherein at least some of the deformable membranes have different sizes.

20. The device of claim 18, wherein each of the passive gripping and releasing apparatus is coupled to a controllable robotic arm.

21. The device of claim 18, wherein the positive source of fluid ingress is configured to supply one or more bursts of positive pressure.

22. The apparatus of claim 18, wherein the at least one port providing the source of fluid ingress and egress comprises two ports disposed in an in-line relationship.

* * * * *